United States Patent

[11] 3,608,759

[72] Inventors Lawrence A. Spurgeon
Arvada;
Earl F. Sorensen, Denver, both of Colo.
[21] Appl. No. 887,948
[22] Filed Dec. 24, 1969
[45] Patented Sept. 28, 1971
[73] Assignee said Spurgeon, by said Sorenson

[54] CAR TOP CARRIER
12 Claims, 5 Drawing Figs.
[52] U.S. Cl. ................................................ 214/450,
214/75 H
[51] Int. Cl. ...................................................... B60r 9/00
[50] Field of Search .......................................... 214/450, 75
H, 316, 1 Q, 1 QD

[56] References Cited
UNITED STATES PATENTS
3,139,203  6/1964  Borger ........................... 214/450

1,354,716  10/1920  Beardsley .................... 214/316
379,693  3/1888  Fitchit ............................ 214/316

Primary Examiner—Gerald M. Forlenza
Assistant Examiner—John Mannix
Attorney—C. B. Messenger ABSTRACT: A mechanism for handling a storage compartment as it is raised from ground level to a carry position on top of a vehicle whereby wheelchairs and the like deposited in said compartment may be stored and transported for convenient useage. Controls regulate up, down, rotational and locking operations of compartment hoist elements that move the compartment transitionally from an upright position at the side of the vehicle to an elevated flat disposition on top of the vehicle with said compartment and all hoist elements being maintained at a low elevation to preserve low clearance characteristics.

PATENTED SEP 28 1971
3,608,759
SHEET 1 OF 2
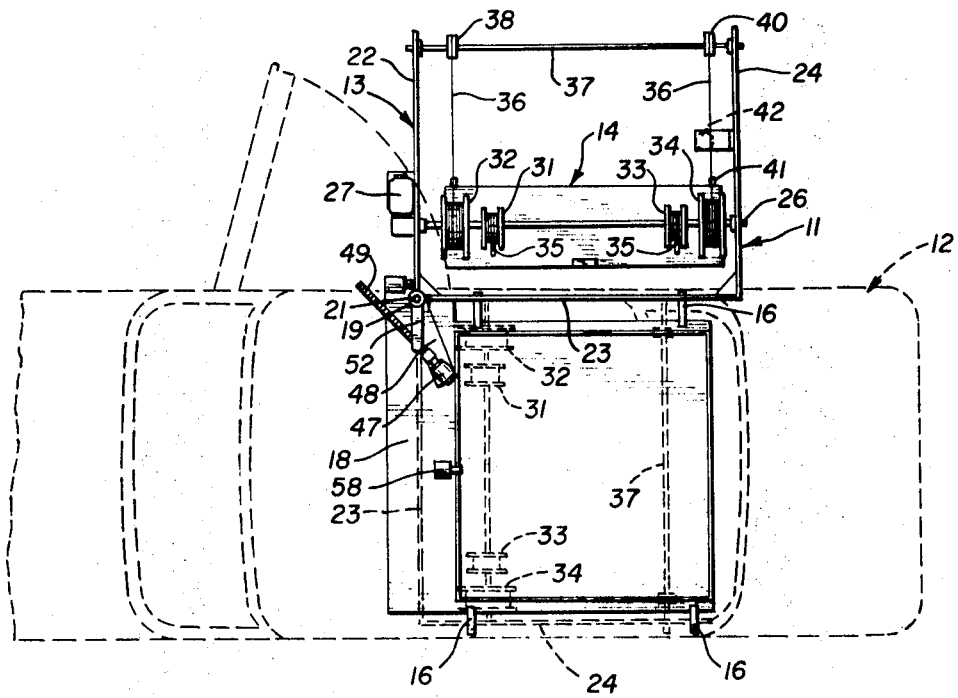
Fig_1
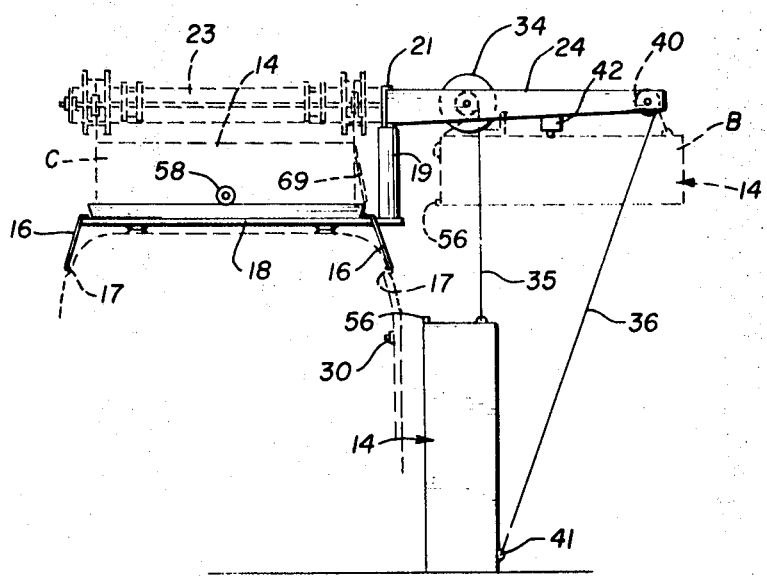
Fig_2
INVENTORS
LAWRENCE A. SPURGEON
EARL F. SORENSEN
BY *(signature)*
ATTORNEY

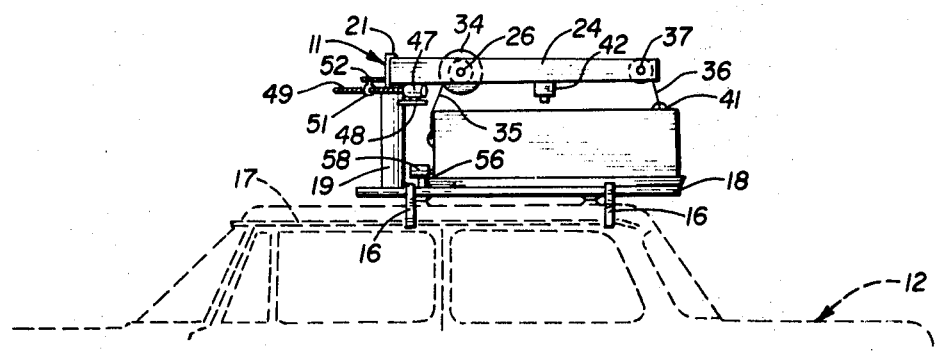
Fig_3
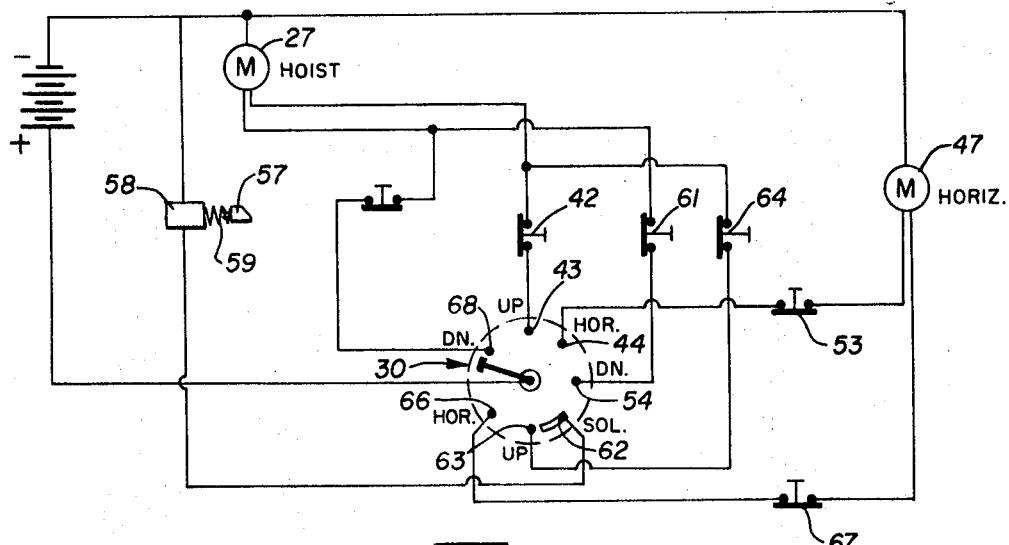
Fig_4
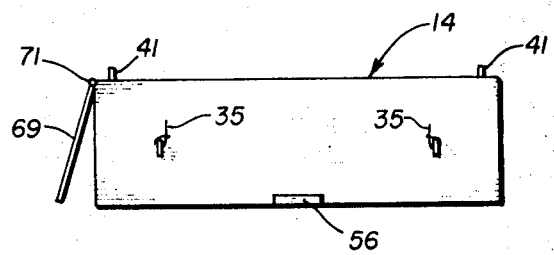
Fig_5
INVENTORS
LAWRENCE A. SPURGEON
EARL F. SORENSEN
BY
ATTORNEY

CAR TOP CARRIER

BACKGROUND OF THE INVENTION

In order to provide mobility for people that are temporarily or permanently disabled, wheelchairs have now received widespread acceptance. With a wheelchair that is either manually or motor propelled, many otherwise disabled persons are now able to pursue worthwhile occupations and businesses. Even with the advent of folding wheelchairs, however, a major problem is still encountered when handicapped individuals are to be transported in motor vehicles.

Motor vehicles having special and advantageous control features are available to help solve problems of mobility, but some handicapped persons now have more difficulty in storing or handling a wheelchair than they do in actual motor vehicle driving operations. For paraplegics the operations of folding and storing a wheelchair can be quite cumbersome, tiring and time-consuming. A single-handicapped individual often cannot store a wheelchair in an automobile trunk compartment, and storage within the vehicle itself is not always desirable. In other instances, the manipulations necessary for storing a wheelchair within the automobile cannot be accomplished. The present car top carrier and hoist mechanism is provided in order to avoid difficulties encountered in connection with the handling of wheel chairs and the like by handicapped individuals.

SUMMARY OF THE INVENTION

Briefly stated, the present invention provides a storage compartment that is adapted to receive a wheelchair or other similar object. At the time of loading or unloading, the storage compartment is disposed alongside a vehicle in position adjacent an access door thereof. A front closure may be moved with respect to the compartment so that a folded wheelchair may be disposed within the compartment. Thereafter a hoisting mechanism engaged to the compartment raises the compartment to a carry position on top of the vehicle. Because of space limitations in garages, beneath covered driveways, etc., the compartment is desirably moved transitionally from one position to another in a pattern designed to provide efficient operations without any part of the compartment or the hoist mechanism itself being raised or disposed above a desired low clearance limit. A cable-type hoist mechanism meeting such requirement moves the compartment upwardly to a flat horizontal position and then rotates the horizontally disposed compartment toward its carry position. At the carry position a lock mechanism engages and holds the compartment on the car top.

BRIEF DESCRIPTION OF THE DRAWINGS

FIG. 1 is a top view with parts of the hoist mechanism shown in alternate position, FIG. 2 is a rear elevation again showing hoist and compartment components in alternate positions, FIG. 3 is a side elevation showing the compartment in its carry position, FIG. 4 is a schematic diagram of an electrical circuit that may be used to activate and control the desired hoisting, lowering and locking operations, and FIG. 5 is a partial top view showing the storage compartment in an upright ground supported position.

DESCRIPTION OF THE PREFERRED EMBODIMENT

FIGS. 1–5 are illustrative of a preferred embodiment of the invention that is particularly adapted for handling and storing wheelchairs and the like. In FIG. 1 the car top carrier mechanism 11 is shown applied to the top of an automotive vehicle 12. The carrier mechanism 11 is inclusive of hoist and support components 13 and a storage compartment 14. The hoist 13 may be mounted on top of the car by use of strap supports 16 that are engaged to the automobile 12 or parts thereof, such as a drip molding 17. Through use of such straps 16 a support base 18 for the hoist 11 is positioned and held on the car top. Base 18 provides support for a corner post 19. A pivot support 21 extends upwardly from the post 19, and support arms 22 and 23 are disposed radially therefrom. A winch shaft arm 24 extends parallel to radial arm 22, and it is supported by the arm 23. A winch shaft 26 is then positioned between the arms 22 and 24 for rotation. A winch drive motor 27 is connected to the shaft 26 to power rotation thereof. Winch drive motor 27 may be inclusive of a gear reduction drive so that a small motor may be satisfactorily used. Operation of the motor 27 and of other functions of the hoist mechanisms are controlled by a control switch 30, which is schematically shown in FIG. 4. Control switch 30 is preferably positioned on a door post of the automobile 12, as indicated in FIG. 2, or in some alternate position that can be conveniently reached by an operator sitting in the automobile seat or from a position outside the automobile.

Cable drums 31 and 33 are positioned inwardly on the shaft 26 for rotation therewith, while drums 32 and 34 of larger diameter are similarly positioned on the shaft 26. Cables 35 extend from the drums 31 and 33 directly to the compartment 14. Other cables 36 are reeved over idler pulleys 38 and 40 on idler shaft 37 before being connected to the lower portion of the compartment 14, as by eyelets 41. When the compartment 14 is to be raised, the switch 30 is moved to a first UP position 43 to energize the motor 27 and to rotate shaft 26 in an up direction. Rotation of shaft 26 and all of the drums 31–33 and 32–34 effectively shortens cables 35 and 36. Drums 32–34, however, are of larger size, and, accordingly, the lower end of the compartment 14 will be swung upwardly and outwardly until the compartment is raised to a horizontal position as shown at B in FIG. 2. At this position a limit switch 42 is engaged by the compartment to stop the hoist motor 27.

In the next operational step the switch is moved to a first Horizontal position 44, and a horizontal drive motor 47 is then energized. This motor 47 is mounted on a support plate 48 extending outwardly from the post 19, and the shaft of the motor is connected to a worm drive shaft 49. A follower nut 51 on a rotor arm 52 engages the worm drive shaft 49, and, accordingly, the rotor arm 52 is moved with respect to the motor 47 and its support plate 48. Rotation of the arm 52, which is attached to the pivot support 21 causes a corresponding rotation of the hoist frame 13. As this frame is rotated, the compartment 14 will be moved to position C as shown in FIG. 2, which corresponds to its carry position as shown in FIG. 3. When adequate turning movement has been obtained, a limit switch 53 will be engaged and the power to the horizontal drive motor 47 will be interrupted. Thereafter movement of switch 30 to the down position 54 will energize the hoist motor 27 in a reverse direction to lower the compartment 14. As the compartment is lowered, a latch 56 on the compartment engages a catch 57 of solenoid lock 58. Spring 59 is compressed, and thereafter the catch 57 will hold the compartment 14 in locked position. Simultaneously a limit switch 61 is engaged to stop hoist motor 27 and to arrest the downward extension of the cables 35 and 36.

With the compartment in this elevated, lowered and locked position, the vehicle 12 may be driven to any desired location. The hoist mechanism and compartment are all at a relatively low elevation, and the vehicle can be driven into private garages, parking garages or under various service-type canopies. The total height of the vehicle and car top carrier-hoist can be kept to less than 7 feet with this type of installation and operation.

After the car has been driven to a new selected location, even a handicapped driver can recover his wheelchair or anything stored in the compartment 41 for local uses. The operations in lowering the compartment are again controlled by switch 30. This switch is moved to the Solenoid position 62, and the coils of the solenoid 58 are then energized to retract the catch 57. The contacts at the Solenoid position 62 are extended so the solenoid will remain energized until the switch is moved to the second UP position 63. Here the hoist motor 27 will be turned on to raise compartment 14 away from the supporting base 18. Limit switch 64 terminates such raising motion, and Horizontal reverse contact 66 is next used to start the horizontal drive motor 47 in a reverse direction to return the hoist 13 and frame components 22–23–24 to the extended position shown in FIG. 1. Limit switch 67 is contacted to deenergize the horizontal drive motor 47, and control switch 30 will next be moved to the Down position 68. The hoist motor will then lower the compartment 14 to a ground supported position.

When the compartment is in its lowered position, a front sidewall 69, which is closest adjacent to the vehicle door support post, can be opened to gain access to the interior of the compartment for removal of any wheelchairs or other object received therein. The mentioned front sidewall may be pivotally mounted on the compartment 14 by a hinge 71, as shown in FIG. 5, or it may be laterally movable away from its closed position. At any rate when the front sidewall 69 is closed, the compartment 14 will provide secure storage for any object received therein.

Beneficially the movement pattern for the hoist mechanism and the compartment itself moves the front sidewall 69 into a position aligned with the side of the vehicle 12 when the compartment is in its elevated carry position. The front sidewall 69 can then be opened manually so that any person having full dexterity and adequate strength can install or remove a wheelchair in the carrier compartment 14. It will not be necessary under such circumstances to operate the hoist and pivot mechanism to obtain ready access to the storage compartment.

While the present description has been concerned with the movement pattern for a compartment 14, it is obvious that a primary objective of the invention is the handling and storage of wheelchairs or other similar items. The use of a storage compartment admittedly provides an additional advantage, since it is desirable to protect a wheelchair or any other object being placed on top of the vehicle from wind and weather. Beneficial use of the invention, however, is not wholly dependent upon the use of a storage compartment, since a wheelchair can itself be handled and stored by the hoisting mechanisms of this embodiment of the invention. The cables 35 can be engaged to top frame components of a wheelchair, while the cables 36 are engaged to lower components of the chair. The chair itself will then be moved through the described movement pattern to a place of car top storage.

Other objects in addition to wheelchairs can similarly be handled in a manner that avoid passage through an intermediate hoist step where some part of the hoisting mechanism or the object itself would be extended to an elevation substantially higher than that necessary through use of the present invention. In order to express this additional utility of the invention, the compartment initially described or any other object to be handled and stored is hereinafter generically termed as "upstanding object." The upstanding object is moved to a "-flat" horizontal position on top of the carrying vehicle or to a rotated flat horizontal position to distinguish from its initial disposition alongside the vehicle. In general, a change in orientation of approximately 90° is contemplated by such "upstanding" to "flat" or upright to horizontal terminology.

Through the exact positioning of all limit switches is not indicated on the drawings, it is believed that the function and operation of such switches is adequately shown in the schematic diagram of FIG. 4. The switches can obviously be located on fixed or moving frame or support components or on the cables or on rotating parts. At all such locations they will be positioned for actuation when a described maneuver has been completed.

We claim:

1. A mechanism for use with motor vehicles to facilitate storage of objects on top of said vehicles by moving the objects to a flat horizontal position on top of said vehicle comprising a support frame for attachment to said vehicle, a hoist mechanism on said frame, means for interconnecting said hoist and said upstanding object, power means for differentially moving the higher and lower portions of said object whereby the object is rotated from an upright plane of orientation and elevated until said object is in flat horizontal position with the initially higher and lower portions of said object being at approximately the same elevation and above the top of said vehicle, and powered mechanism for moving said object horizontally to a position of storage above said vehicle top, all of said hoist and powered mechanism being maintained at all times at a low clearance elevation corresponding to the height of said vehicle plus the height of said object in its stored position and with the object and portions thereof at all times not exceeding said low clearance elevation.

2. The mechanism as set forth in claim 1 wherein the differential movement pattern for said object is simultaneous and continuous with respect to the elevation thereof.

3. The mechanism as set forth in claim 1 wherein the higher portion of said object is moved vertically by said hoist mechanism and power means as the object is elevated whereby the object is not swung outwardly with respect to said vehicle and a narrow side clearance is accordingly maintained.

4. The mechanism as set forth in claim 1 wherein the hoist mechanism is inclusive of pulley and tension elements.

5. The mechanism as set forth in claim 4 wherein a cable hoist mechanism is utilized and further comprising separate cables for attachment to the higher and lower portions of said object.

6. The mechanism as set forth in claim 5 wherein separate cable drums are provided for the separate cables and wherein said drum are of different diameter to accomplish rotation of said object as it is elevated.

7. The mechanism as set forth in claim 6 wherein all of said drums are rotated by said power means at the same rotative speed.

8. The mechanism as set forth in claim 1 wherein the powered mechanism for moving said object horizontally rotates said object to its position of storage.

9. The mechanism as set forth in claim 8 wherein the object manipulated by said mechanism is a wheelchair.

10. The mechanism as set forth in claim 8 wherein the object to be elevated and stored is a compartment and further comprising an access opening for said compartment with said access opening being disposed for convenient loading when the compartment object is in its upstanding position alongside the vehicle.

11. The mechanism as set forth in claim 10 wherein said access opening is on a front sidewall of said compartment disposed forwardly.

12. The mechanism as set forth in claim 10 wherein said access opening is still disposed at a side of said vehicle after said compartment object has been elevated and rotated horizontally to its stored position on top of said vehicle.